US008703636B2

(12) United States Patent
Ogunwumi et al.

(10) Patent No.: US 8,703,636 B2
(45) Date of Patent: Apr. 22, 2014

(54) METHOD OF MANUFACTURING A CATALYST BODY BY POST-IMPREGNATION

(75) Inventors: Steven Bolaji Ogunwumi, Painted Post, NY (US); Mallanagouda Dyamanagouda Patil, Corning, NY (US)

(73) Assignee: Corning Incorporated, Corning, NY (US)

( * ) Notice: Subject to any disclaimer, the term of this patent is extended or adjusted under 35 U.S.C. 154(b) by 254 days.

(21) Appl. No.: 12/394,497

(22) Filed: Feb. 27, 2009

(65) Prior Publication Data
US 2010/0222205 A1  Sep. 2, 2010

(51) Int. Cl.
| | | |
|---|---|---|
| B01J 21/00 | (2006.01) |
| B01J 23/10 | (2006.01) |
| B01J 27/224 | (2006.01) |
| B01J 27/24 | (2006.01) |
| B01J 29/00 | (2006.01) |
| B01J 29/06 | (2006.01) |
| B01J 29/072 | (2006.01) |
| B01J 29/076 | (2006.01) |
| B01J 29/08 | (2006.01) |
| B01J 29/14 | (2006.01) |
| B01J 29/16 | (2006.01) |
| B01J 29/18 | (2006.01) |
| B01J 29/24 | (2006.01) |
| B01J 29/26 | (2006.01) |
| B01J 29/40 | (2006.01) |
| B01J 29/46 | (2006.01) |
| B01J 29/48 | (2006.01) |
| B01J 29/70 | (2006.01) |
| B01J 29/76 | (2006.01) |
| B01J 29/78 | (2006.01) |
| B01J 29/83 | (2006.01) |

(52) U.S. Cl.
USPC ............. 502/65; 502/64; 502/71; 502/73; 502/74; 502/77; 502/78; 502/79; 502/178; 502/200; 502/242; 502/304; 502/349

(58) Field of Classification Search
None
See application file for complete search history.

(56) References Cited

U.S. PATENT DOCUMENTS

| 4,927,799 A | 5/1990 | Matsumoto et al. |
| 5,520,895 A | 5/1996 | Sharma et al. |

(Continued)

FOREIGN PATENT DOCUMENTS

| DE | 37 37 419 | 5/1988 |
| EP | 0 510 772 | 10/1992 |
| EP | 1 504 805 | 2/2005 |
| WO | 94/08914 | 4/1994 |
| WO | 00/51715 | 9/2000 |
| WO | 2004/022229 | 3/2004 |
| WO | 2005/105302 | 11/2005 |
| WO | 2006/026067 | 3/2006 |
| WO | 2006/109849 | 10/2006 |
| WO | WO 2008049491 A1 * | 5/2008 |
| WO | 2008/150462 | 12/2008 |
| WO | 2008/153826 | 12/2008 |
| WO | 2009/073099 | 6/2009 |

OTHER PUBLICATIONS

Merriam-Webster online dictionary (Merriam-Webster.com), Definition of "Ceramic," accessed Dec. 1, 2010.*
Wusirika et al.; "Extruded Zeolite Catalysts for Lean Exhaust Application"; Society of Automotive Engineers, [Special Publication] SP (2005); SP-1943 (Advanced Catalysts and Substrates), 141-151.

*Primary Examiner* — Melvin C Mayes
*Assistant Examiner* — Colin W Slifka
(74) *Attorney, Agent, or Firm* — Charles A. Greene; Joseph M. Homa

(57) ABSTRACT

A method of manufacturing a catalyst body which includes: combining one or more inorganic components with an inorganic binder, and optionally with an organic binder, to form a mixture, the one or more inorganic components comprising a primary phase material being zeolite, or $CeO_2$—$ZrO_2$, or a combination; forming the mixture into a shaped body; firing the shaped body to allow the inorganic binder to bind the one or more inorganic components; impregnating the shaped body with a source of a reducing or oxidizing element; and heating the impregnated shaped body to form a redox oxide from the source, the redox oxide being supported by the shaped body.

27 Claims, 1 Drawing Sheet

(56) References Cited

U.S. PATENT DOCUMENTS

| | | |
|---|---|---|
| 5,552,128 A | 9/1996 | Chang et al. |
| 5,849,255 A * | 12/1998 | Sawyer et al. ............. 423/213.5 |
| 6,379,640 B1 | 4/2002 | VerNooy |
| 6,780,805 B2 | 8/2004 | Faber et al. |
| 2005/0129601 A1* | 6/2005 | Li et al. ....................... 423/239.2 |
| 2005/0159304 A1* | 7/2005 | Ichiki et al. .................. 502/216 |
| 2006/0052233 A1* | 3/2006 | Beeckman et al. ............. 502/60 |
| 2006/0292339 A1* | 12/2006 | Ohno et al. ................... 428/116 |
| 2007/0089403 A1* | 4/2007 | Pfeifer et al. ................... 60/286 |
| 2007/0140953 A1 | 6/2007 | Ruettinger et al. |
| 2008/0041045 A1* | 2/2008 | Zhan ............................... 60/301 |
| 2008/0307779 A1* | 12/2008 | El-Malki et al. ................. 60/299 |
| 2009/0088318 A1* | 4/2009 | McDaniel et al. ............. 502/208 |
| 2009/0196813 A1* | 8/2009 | Sobolevskiy et al. ...... 423/239.2 |
| 2010/0034717 A1* | 2/2010 | Adelmann et al. ......... 423/213.2 |

* cited by examiner

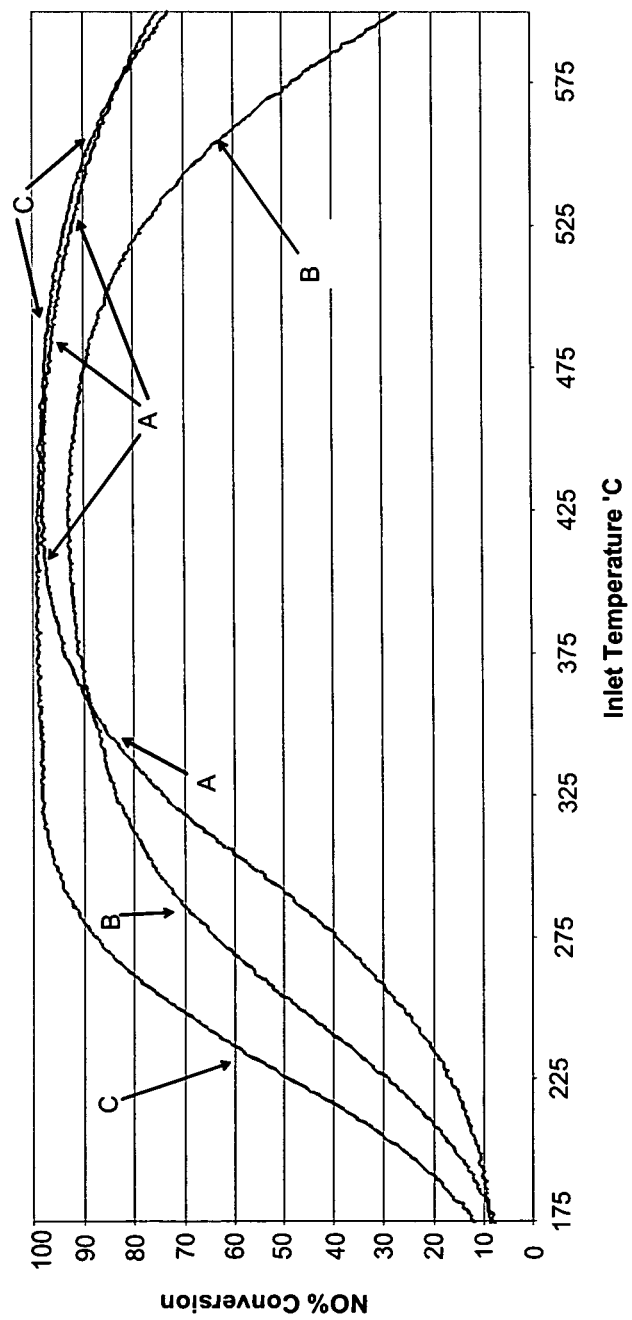

METHOD OF MANUFACTURING A CATALYST BODY BY POST-IMPREGNATION

FIELD

The present invention relates generally to methods of manufacturing catalyst bodies, such as extruded honeycomb catalyst bodies, such as for use in engine exhaust systems.

BACKGROUND

Various methods and devices are known for reducing emissions of engine exhaust, including catalyst supports, substrates, and filters.

SUMMARY

The present disclosure relates to methods of manufacturing catalyst bodies, such as extruded honeycomb catalyst bodies, such as for use in engine exhaust systems. Generally, a shaped body of high surface area material is post-impregnated with a source of at least one reducing or oxidizing element. In some embodiments, the high surface area material has a BET specific surface area of 30 m$^2$/g or greater, in other embodiments 75 m$^2$/g or greater, in other embodiments 100 m$^2$/g or greater, in other embodiments 150 m$^2$/g or greater, and in still other embodiments between 120 and 300 m$^2$/g.

In one aspect, a method of manufacturing a catalyst body is disclosed herein, the method comprising: combining one or more inorganic components with an inorganic binder, and optionally with an organic binder, to form a mixture, the one or more inorganic components comprising a primary phase material being selected from the group consisting of a zeolite, CeO$_2$—ZrO$_2$, and combinations thereof; forming the mixture into a shaped body; firing the shaped body for a first time and at a first furnace temperature sufficient to allow the inorganic binder to bind the one or more inorganic components; impregnating at least part of the shaped body with a source of at least one reducing or oxidizing element ("redox oxide"); and heating the impregnated shaped body for a second time and at a second furnace temperature sufficient to form a redox oxide from the source, the redox oxide being supported by the shaped body. Unless otherwise noted herein, if the mixture comprises zeolite and CeO$_2$—ZrO$_2$, the CeO$_2$—ZrO$_2$ is present with a Zr/Ce ratio of greater than 1.0.

In some embodiments, an extruded honeycomb catalyst body is comprised of zeolite combined with at least one oxide of a reducing and oxidizing element. The reducing and oxidizing elements are selected from the transition and rare-earth groups.

In some embodiments, the extruded honeycomb catalyst bodies of the present disclosure provide a operating temperature window exhibiting the reduction of Nitrogen Oxide ("NOx") gas in which the temperature of the NOx gas is at least as low as 200° C. and at least as high as 600° C.

Additional features and advantages of the present disclosure will be set forth in the detailed description which follows, and will be readily apparent to those skilled in the art from that description or recognized by practicing the subject matter as described herein, including the detailed description which follows, the claims, as well as the appended drawings.

It is to be understood that both the foregoing general description and the following detailed description are intended to provide an overview or framework for understanding the nature and character of the inventions as claimed. The accompanying drawings and figures are included to provide a further understanding of the disclosure, and are incorporated into and constitute a part of the specification. The figures illustrate various embodiments and aspects of the disclosure, and together with the description serve to explain the principles and operations of the claimed invention.

BRIEF DESCRIPTION OF THE DRAWINGS

FIG. 1 is a graphic illustration comparing NO$_x$ gas conversion for extruded CeO$_2$—ZrO$_2$ Zeolite (ZSM-5) body (curve A), extruded CeO$_2$—ZrO$_2$ body post-impregnated with tungsten (curve B) and extruded CeO2-ZrO2-zeolite (ZSM-5) body post-impregnated with tungsten (curve C) as a function of inlet gas temperature at the inlet of each body.

DETAILED DESCRIPTION

Reference will now be made in detail to the embodiments of the disclosure, examples and aspects of which are illustrated in the accompanying figures.

In one aspect, a method of manufacturing a catalyst body is disclosed herein, the method comprising: combining one or more inorganic components with an inorganic binder, and optionally with an organic binder, to form a mixture, the one or more inorganic components comprising a primary phase material being selected from the group consisting of a zeolite, CeO$_2$—ZrO$_2$, and combinations thereof; forming the mixture into a shaped body; firing the shaped body for a first time and at a first furnace temperature sufficient to allow the inorganic binder to bind the one or more inorganic components; impregnating at least part of the shaped body with a source of at least one reducing or oxidizing element; and heating the impregnated shaped body for a second time and at a second furnace temperature sufficient to form a redox oxide from the source, the redox oxide being supported by the shaped body. That is, the redox oxide can be present in, or on, the shaped body. In some embodiments, the mixture comprises a fibrous constituent.

In some embodiments, the one or more inorganic components further comprises a secondary phase material being selected from the group consisting of alumina, zirconia, mullite, silicon carbide, zircon, titania, silicon nitride, ceria, silica, or sources thereof, or mixtures thereof, and after the forming and before the impregnating, the inorganic binder binds the primary phase material and the secondary phase material. In some of these embodiments, the primary phase material comprises a zeolite and the secondary phase material comprises CeO$_2$—ZrO$_2$ having a surface area of at least 15 m$^2$/gram. In some of these embodiments, the mixture comprises a fibrous constituent. In some embodiments, the mixture comprises one or more zeolites constituting greater than 50 wt % of the one or more inorganic components. In other embodiments, the mixture includes no zeolite, the primary phase material comprises CeO$_2$—ZrO$_2$, and the at least one reducing or oxidizing element comprises W, V, Mo, and combinations thereof In some embodiments, the reducing or oxidizing element is selected from the group consisting of Cu, Fe, W, V, Mo, Co, Mn, La, and combinations thereof. In some embodiments, the reducing or oxidizing element is selected from the group consisting of Cu, Fe, W, V, Mo, and combinations thereof. In some embodiments, the reducing or oxidizing element is selected from the group consisting of W, V, Mo, and combinations thereof. In some embodiments, the primary phase material comprises a zeolite and the reducing or oxidizing element is selected from the group consisting of W, V, Mo, and combinations thereof.

In some embodiments, the source is a tungstate source. In some of these embodiments, the tungstate source is a tungstate precursor; in some embodiments, the tungstate source is ammonium meta-tungstate. In these embodiments, the tungstate source is preferably soluble in the liquid vehicle.

In some embodiments, the method includes, after extruding and before impregnating, firing where the firing comprises heating the shaped body sufficient to consolidate the shaped body.

After the impregnated shaped body is heated, the redox oxide preferably is present in the shaped body, or on the shaped body, or both.

In some embodiments, the impregnated shaped body is heated for at least 2 hours at a furnace temperature of at least 450° C.

In some embodiments, the inorganic binder is selected from the group consisting of a silicon-based material, a phosphate-based material, and combinations thereof. In some of these embodiments, the inorganic binder comprises silicone.

In some embodiments, the primary phase material comprises a zeolite, and the zeolite comprises Fe, Ce, W, Mn, Pr, Nd, La, Zr, Al, Cu or mixtures thereof In some embodiments, the zeolite is selected from the group consisting of ZSM-5, Chabazite, Beta, Mordenite, Y-zeolite, Ultrastable-Y and aluminum phosphate zeolites, and mixtures thereof. In some embodiments, the zeolite material can have an average pore diameter ranging from 0.5 nm to 0.7 nm. One source of ZSM-5 zeolite is supplied by Zeolyst International.

The organic binder, if present, comprises a cellulosic ether in some embodiments. The organic binder, if present, may comprise a methylcellulose-based component. In some embodiments, the method further comprises, after extruding and before impregnating, heating the shaped body sufficient to remove the organic binder from the shaped body.

In some embodiments, the mixture further comprises a liquid vehicle. In some of these embodiments, the method may further comprise removing at least a portion of the liquid vehicle from the shaped body prior to the firing.

In some embodiments, the forming comprises extruding, printing (such as 3D printing) or pressing the mixture. In some embodiments, the shaped body comprises a honeycomb structure.

The redox oxides can have high surface area ranging from 15 m²/g to 200 m²/g.

In one embodiment, an extruded honeycomb catalyst body (the "catalyst body") is manufactured from a zeolite, an inorganic binder such as alumina, and a tungstate source such as ammonium meta-tungstate. In some embodiments, the catalyst body is especially suited in applications for treating diesel and lean burning engine exhaust containing $NO_x$, HC and ammonia gas.

In some embodiments, the catalyst body manufactured as disclosed herein can be used in an engine exhaust system, for example in the selective catalytic reduction (SCR) of nitrogen oxide with ammonia, such as for diesel engines. In some embodiments, the catalyst body can accommodate the SCR reaction even when reaction conditions change over a normal duty cycle for the engine, for example with reaction temperature varying from 200° C. to over 500° C., and even with temperature excursions to greater than 600° C.

The SCR reaction can be conducted by injecting a reducing agent, such as ammonia derived from the breakdown of urea, into the exhaust stream of the engine. Both ammonia and the hot exhaust gas containing NO (or NO/NO₂ mixtures; collectively: "$NO_x$") can be impinged onto the catalyst body, with reaction to nitrogen following one of the following stoichiometries[1]:

$$4NO+4NH_3+O_2=4N_2+6H_2O$$

$$2NO+2NO_2+4NH_3=4N_2+6H_2O$$

In some preferred embodiments, these nitrogen reactions proceed rapidly, and as close as possible to completion, over a broad operating temperature window, with minimal unreacted ammonia passing into the vehicle exhaust, i.e. with minimal ammonia slip.

At the same time, competing reactions are advantageously not catalyzed. A particularly problematic competing reaction is the oxidation of ammonia, which can occur at higher temperatures, as follows:

$$4NH_3+3O_2=2N_2+6H_2O \text{(selective)}$$

$$4NH_3+5O_2=4NO+6H_2O \text{(non-selective)}.$$

Ammonia oxidation can at a minimum disturb the SCR stoichiometry, and can even increase NO content of the exhaust stream. For conversion of $NO_x$ to $N_2$ at desired levels, a catalyst should be advantageously active; for example at temperatures as lows as 200 C and at a space velocity of at least 20,000/hr, a 500 ppm NO inlet could have 30% or more conversion; under similar flow conditions, the catalyst could convert greater than 80% of the NO at 550 C.

Both zeolite and redox oxides are stable at automobile exhaust temperatures, exhibit selective catalytic reduction ("SCR"), and can be used with urea injection. These catalysts have $NH_3$ adsorption, $NO_x$ adsorption, and $NO_x$ oxidation sites for optimum $NO_x$ reduction performance. Adsorbed $NH_3$ on the surface interacts with adjacent adsorbed $NO_x$. The $NO_x$ is accordingly reduced to nitrogen and $H_2O$. Zeolite and redox oxides exhibit SCR activity of $NO_x$, however, in different temperature ranges. Zeolite converts NH3 at temperatures as high as 600° C. while redox oxides convert $NH_3$ at lower temperatures. In another aspect, the HC and ammonia gases are also catalytically reduced by the catalyst body.

Combining zeolite with one or more redox oxides widens the effective $NO_x$ conversion or reducing temperature window. At least certain embodiments of the catalyst body disclosed herein have exhibited an operating temperature window of at least as low as 200° C. and at least as high as 600° C. for the effective reduction of $NO_x$ gas The disclosure may be further understood by reference to the following examples, which are intended to be merely illustrative of the compositions and methods for carrying out the invention. In one example, the composition of the primary phase material of the catalyst body ranges from 2% to 95% redox oxide with the remaining balance of the primary phase material being primarily zeolite. In other examples, the composition of the primary phase material of the catalyst body ranges from 10% to 80%, 20% to 80%, 30% to 80%, 40% to 80%, 50% to 80%, 60% to 80%, 70% to 80%, 30% to 70%, 50% to 70%, or 55% to 65% redox oxide with the remaining balance of the primary phase material being primarily zeolite.

Additional examples of the catalyst body's composition are contained in Table 1 below. Other embodiments include compositions of the primary phase material being $CeO_2$—$ZrO_2$, and with the remaining balance of the primary phase material being primarily zeolite catalyzed with ammonium meta-tungstate.

TABLE 1

| | ID | CeO$_2$—ZrO$_2$ wt % | Zeolite wt % | wt. % WO$_3$ | Ammonium tungstate for 1 g of catalyst | Wt (g) of NH$_4$-tungstate | Geometry | Fired | Aged |
|---|---|---|---|---|---|---|---|---|---|
| Ce—Zr-ZSM5 | A | 60 | 40 | n/a | n/a | n/a | 400-4 | 3 hrs @ 550 C. | 64 hrs @ 700 C. |
| W—Ce—Zr | B | 100 | None | 10.6 | 0.114 | 0.774 | 400-4 | 3 hrs @ 550 C. | 64 hrs @ 700 C. |
| W—Ce—Zr-ZSM5 | C | 60 | 40 | 6.36 | 0.0684 | 0.458 | 400-4 | 3 hrs @ 550 C. | 64 hrs @ 700 C. |

The firing procedure can be achieved with known ovens, such as periodic (or batchwise) ovens, or kilns, such as tunnel kilns that employ one or more conveyors. In some embodiments, the green structures are fired by exposing the green structures to a heated gaseous environment, such as air, wherein the air is heated to temperatures in the range of about 400° C.-1200° C., and in some of these embodiments between about 600° C. to 900° C., with a residence time in that temperature range of a duration sufficient to complete sintering of the body. The residence time can be about 1 to 10 hours, and in some embodiments from 3 to 6 hours, and may depend, for example, on the type or source of components employed.

FIG. 1 is a graphic illustration comparing NO$_x$ gas conversion for extruded CeO$_2$—ZrO$_2$ Zeolite (ZSM-5) body (curve A), extruded CeO$_2$—ZrO$_2$ body post-impregnated with tungsten (curve B) and extruded CeO$_2$—ZrO$_2$-zeolite (ZSM-5) body post-impregnated with tungsten (curve C) as a function of inlet gas temperature at the inlet of each body. Table 1 describes examples A through C.

The catalyst bodies tested in FIG. 1 were produced by mixing the desired compositions and extruding the mixture as described above into 1 inch diameter honeycomb with 400 cells per square inch and 4 mil (0.004 inch) wall thickness. These extruded bodies were fired at a furnace temperature of 550° C. for 3 hours. The bodies were then loaded with ammonium meta-tungstate by dipping. The bodies were again fired at a furnace temperature of 550° C. for 3 hours. The bodies were aged under hydrothermal conditions at 700° C. for 64 hours.

The SCR NO$_x$ conversion results from FIG. 1 were obtained using a 1 inch lab bench reactor at 20000 space velocity. The inlet gas composition was 500 ppm NO$_x$, 500 ppm NH$_3$, 6% O$_2$, 5% H$_2$O, 10% CO$_2$, and balance N$_2$. The reactor temperature was ramped from room temperature to 650° C. in 120 minutes. The gases (NO$_x$ and NH$_3$) were detected by FTIR detector. As shown in FIG. 1, the NO$_x$ conversion is plotted vs. inlet gas temperature (° C.); Examples A (extruded Ce—Zr-ZSM-5 zeolite), B (extruded Ce—Zr with post-impregnated W), C (extruded Ce—Zr-ZSM-5 zeolite with post-impregnated W) each achieved greater than 50% NOx conversion at temperatures below 300° C., and post-impregnation of tungsten provides greater than 50% NOx conversion at inlet temperatures below 275° C. (unlike Example A). As also seen in FIG. 1, post-impregnation of tungsten provides greater than 70% NOx conversion at inlet temperatures between 290° C. and 540° C. (unlike Example A), with Example C providing greater than 70% NOx conversion at inlet temperatures between 250° C. and 600° C., and greater than 80% NOx conversion at inlet temperatures between 265° C. and 580° C., and greater than 90% NOx conversion at inlet temperatures between 280° C. and 545° C. Examples B and C also both provide greater than 80% NOx conversion at inlet temperatures between 315° C. and 515° C.

In another embodiment, the catalyst body is formed with one or more layers of zeolite and one or more layers of a redox oxide. In one embodiment, the combined zeolite and redox oxide compositions described above are also used in combination with these one or more layers. In a particular embodiment, the zeolite or redox oxide or both are also added as a coating to the body.

The catalyst bodies are produced by mixing batch materials, blending the mixture, forming a green body, and subsequently sintering or firing the green body to a hard porous structure. A batch mixture suitable for extrusion can be prepared by mixing the components described above with a suitable liquid vehicle. The vehicle may comprise water and extrusion aids necessary to give the batch plastic formability and sufficient green strength after forming to resist breakage prior to firing. Various lubricants, binders, surfactants, pore-formers, and viscosity modifiers can be added to the batch during the mixing step to provide viscosity control, plasticity, and strength prior to firing, and porosity to the fired structure.

The inorganic binder component holds the body together to achieve strong mechanical structure for the body. Suitable inorganic binder materials include silica or silica forming materials such as silicone, alumina, or phosphates. Mixtures or combinations of inorganic binder materials may also be used. In some embodiments, the binder is advantageously selected from silicone binding agents such as silicone resins and/or emulsions, which can be provided as precursors, for example, silica precursors such as silicone resin, or colloidal silica. The binder can advantageously be incorporated in the form of a silicone resin or silicone emulsion. Silicone resins can be added to the mixture in the form of an aqueous emulsion, and are commercially available, such as Wacker AG SILRES® M 50 E (an emulsion of a methyl silicone resin with reported solids content of 52%-55%) or Wacker AG SILRES® M 97 E, both available from Wacker-Chemie GmbH of Munich, Germany. In some embodiments, the binder is incorporated in the batch mixtures such that the fired ceramic contains silica binder in an amount ranging from about 5% to about 30% by weight, in some of these embodiments, preferably 15%-30%, and in some of these embodiments, about 20%. The amounts of the binders are based on the expected weight after heat-treatment which will be the weight of the binder in the product body. For example, when silicone resins are used the weight of the binder in the product is the weight of silica added via the resins.

The extrusion aids can comprise plasticizers/paste formers, as well as processing aids such as lubricants. The plasticizers/paste formers help provide plasticity during forming, and some strength to the extruded body prior to firing. Organic pastes suitable for the purposes set forth herein include cellulose ether type materials and/or their derivatives.

Sources of cellulose ethers and/or derivatives thereof include the Methocel™ line of cellulose ethers, from Dow Chemical Co., and mixtures thereof. Methylcellulose is an example of an organic paste forming agent suitable for use in formulating the catalyst bodies of the present disclosure. The organic paste and other processing aids are generally added as a super addition over the combined weight of the primary phase material and inorganic binder (based on expected weight after heat treatment). In some embodiments, the super addition of organic paste can be in the range of about 3%-8% by weight super-addition, but other amounts may be utilized. The organic paste or temporary binder material is substantially burned off during the subsequent firing of the honeycomb body. One or more pore former agents, such as graphite or starch, can be added in an amount less than 70% super-addition, but preferably less than 50% super-addition, to achieve an increased porosity and median pore size, such as for ceramic bodies used in an exhaust gas filter application. Water may be added to the batch components to achieve the necessary plasticity for handling and extrusion. Water-based binders can be used for ease of processing in this regard. The mixtures preferably also contain super addition of a pore-former or mixtures thereof, as described above, to assist in controlling the porosity and mean pore size of the fired product.

In some embodiments, a method of manufacturing the catalyst-based honeycomb body includes the steps wherein the compositions described above are mixed together in a liquid vehicle to form a slurry. Thereafter, the slurry is spray-dried, or similar techniques are used, as an additional process step to mix the materials, increase the particle size and obtain a more uniform particle distribution prior to extrusion and firing. The spray-drying forms agglomerates of the spray-dried components. The agglomerates can be heated to form calcined agglomerates or used directly after spray-drying, which may then be used to form an extrusion batch mixture as is generally known.

One method of forming the structure is by extrusion through a forming die. A ram extruder, continuous auger, single screw extruder, or twin screw extruder or other known extrusion apparatus can be used. The honeycomb body according to the present disclosure can have any convenient size and shape, for example, a right circular cylindrical shape structure. The honeycomb body can be extruded to form a matrix of walls wherein the primary phase material(s), secondary phase material(s) (if present) and permanent binder are generally homogenously distributed throughout the walls. The matrix of walls define channels extending through the honeycomb body. The honeycomb body can be coated with a skin material at the outer periphery of the structure as is known in the art.

In certain embodiments, $WO_3$ is added to enhance the $NO_x$ conversion at lower temperature. This is caused by an increase of $NH_3$ adsorption sites at room temperature and at lower temperature which enhances the $NO_x$ conversion. Prior to firing the extruded catalyst body is post-impregnated with $WO_3$.

In another aspect, the catalyst body has an improved thermo-mechanical durability and improved thermal shock resistance due to a net balance or lowering of the coefficient of thermal expansion ("CTE") resulting from the mixture. Thermal shock resistance depends on the CTE. The closer the CTE is to zero, the more thermally shock resistant is the material. Zeolites typically have low or negative CTEs, that is, a CTE of $-20 \times 10^{-7}/°$ C., or even lower over their useful stable temperature ranges. The redox oxides typically have higher CTE than the zeolite. The catalyst body has a higher CTE than zeolite materials not combined with redox oxides. The redox oxide having a positive CTE balances the negative CTE of the zeolite. Thus, the present disclosure potentially provides thermally shock resistant catalyst-based honeycomb bodies and methods of making them.

Embodiments of the extruded catalyst-based honeycomb bodies of the present disclosure can be particularly suited for use as flow through substrates or as exhaust filters such as in diesel exhaust and lean burn exhaust systems. The honeycomb bodies of the present disclosure preferably exhibit high surface area and low thermal expansion, and in some embodiments reduce or eliminate the need for excessive high surface area washcoating.

In some of embodiments, the honeycomb body is a flow through substrate. In other embodiments, the honeycomb body is a wall flow filter, such as a particulate filter, for example a diesel particulate filter. In filter embodiments, some of the cells may be plugged so as to seal the respective cell channels in the so-formed catalyst-based honeycomb body. For example, in some embodiments a portion of the inlet end cell channels are plugged and a portion of the outlet end cell channels are plugged but not corresponding to those at the inlet end, such that each cell is plugged at one end only. Plugging at the ends of the cell channels is preferably accomplished with plugs having a depth of about 5 mm to 20 mm. In some embodiments, the arrangement is to have every other cell channel on a given end plugged in a checkered pattern.

In one set of embodiments, a method of manufacturing a catalyst body is disclosed herein comprising the steps of: combining zeolite with at least one oxide of a redox element to form a mixture; extruding the mixture into a honeycomb shaped body; impregnating at least part of the honeycomb shaped body with ammonium meta-tungstate; and firing the impregnated honeycomb shaped body at a furnace temperature of at least 450° C. for at least 2 hours. The mixture may further comprise an inorganic binder. The mixture may further comprise a liquid vehicle. In some of these embodiments, the impregnating comprises dipping the honeycomb shaped body in ammonium meta-tungstate.

In another set of embodiments, a method is disclosed herein of manufacturing a catalyst body comprising the steps of: forming a mixture of $CeO_2$—$ZrO_2$ into a shaped body; impregnating at least part of the shaped body with a tungstate source; firing the impregnated honeycomb shaped body at a furnace temperature of at least 450° C. for at least 2 hours. The mixture may further comprise an inorganic binder, or filler, such as alumina. In some embodiments, the furnace temperature is greater than 500° C. for at least 2 hours, in other embodiments greater than 600° C., in some embodiments between 500° C. and 800° C., in other embodiments between 500° C. and 700° C., and in other embodiments between 600° C. and 700° C. The shaped body can be formed by extrusion or pressing. The shaped body can comprise a honeycomb structure. The tungstate source can comprise a tungstate precursor, preferably soluble in the liquid vehicle, for example ammonium meta-tungstate. The mixture can further comprise zeolite; the zeolite can comprise Fe, Ce, W, Mn, Pr, Nd, La, Zr, Al, Cu or mixtures thereof In a subset of embodiments, the shaped body is formed by extruding the mixture, and the shaped body comprises a honeycomb structure.

In another set of embodiments, a method is disclosed herein of manufacturing a catalyst body comprising the steps of: extruding a mixture of zeolite and the $CeO_2$—$ZrO_2$ into a shaped body; impregnating at least part of the shaped body with a tungstate source; then firing the impregnated shaped body at a furnace temperature of at least 450° C. for at least 2 hours. The mixture may further comprise an inorganic binder, such as a silicon-based component or a silicon-based binder, for example silicone. The mixture may further comprise an organic binder, such as a cellulosic ether, for example methylcellulose. The mixture may further comprise a liquid vehicle; the method may further comprise removing at least a portion of the liquid vehicle from the shaped body prior to the firing. The method may further comprise, after extruding and before impregnating, firing which comprises heating the shaped body sufficient to convert the shaped body into a consolidated body. The method may further comprise, after extruding and before impregnating, heating the shaped body sufficient to remove some or all of any organic binder from the shaped body. In some of these embodiments, the shaped body is formed by extrusion. In some of these embodiments, the shaped body comprises a honeycomb structure. The zeolite may comprise Fe, Ce, W, Mn, Pr, Nd, La, Zr, Al, Cu or mixtures thereof. The tungstate source can be a tungstate precursor, such as ammonium meta-tungstate, preferably soluble in the liquid vehicle. In some embodiments, the impregnated body is heated sufficient to consolidate the ceria-zirconia oxides.

In another set of embodiments, a method is disclosed herein of manufacturing a catalyst body comprising: extruding a mixture of an inorganic binder and oxide-based components, the oxide-based components being comprised of zeolite and $CeO_2$—$ZrO_2$, into a shaped body, the zeolite comprising less than 50 wt % of the oxide-based components; impregnating at least part of the shaped body with a tungstate source, then firing the impregnated honeycomb shaped body at a furnace temperature of at least 450° C. for at least 2 hours. The shaped body can comprise a honeycomb structure. The tungstate source can comprise ammonium meta-tungstate. In some of these embodiments, the zeolite comprises less than 50 wt % of the oxide-based components and the $CeO_2$—$ZrO_2$ comprises greater than 50 wt % of the oxide-based components; in some of these embodiments, the zeolite comprises between 35% and 45 wt % of the oxide-based components and the $CeO_2$—$ZrO_2$ comprises between 55% and 65 wt % of the oxide-based component. In another set of embodiments, a method is disclosed herein of forming a catalyst structure comprising the steps of: extruding a mixture of an inorganic binder and oxide-based components, the oxide-based components being comprised of zeolite and $CeO_2$—$ZrO_2$, into a shaped body, the zeolite comprising greater than or equal to 50 wt % of the oxide-based components; then firing the shaped body at a furnace temperature of at least 450° C. for at least 2 hours, wherein the shaped body is substantially free of W; then impregnating at least part of the shaped body with a source of at least one reducing or oxidizing element. In some embodiments, the source is a tungstate source. The method may further comprise heating the impregnated shaped body for a second time and at a second furnace temperature sufficient to form a redox oxide from the source, the redox oxide being supported by the shaped body. The shaped body can comprise a honeycomb structure. The tungstate source can comprise ammonium meta-tungstate.

It will be apparent to those skilled in the art that various modifications and variations can be made to the present disclosure without departing from the spirit and scope of the invention. Thus it is intended that the present invention cover the modifications and variations of this disclosure provided they come within the scope of the appended claims and their equivalents.

What is claimed:

1. A method of manufacturing a catalyst body, the method comprising:
   combining a primary phase material with an inorganic binder, and optionally with an organic binder, to form a mixture, the primary phase material consisting of a zeolite and a $CeO_2$—$ZrO_2$, wherein the zeolite constitutes greater than 50 wt % of the primary phase material, and the $CeO_2$—$ZrO_2$ is present with a Zr/Ce ratio of greater than 1.0;
   extruding the mixture into a honeycomb body;
   firing the honeycomb body for a first time and at a first furnace temperature sufficient to allow the inorganic binder to bind the primary phase material, wherein the honeycomb body is active for selective catalytic reduction of $NO_x$ after firing the honeycomb body for the first time and at the first temperature;
   impregnating at least part of the honeycomb body with a source of at least one reducing or oxidizing element; and
   widening an operating temperature window of the impregnated honeycomb body for reduction of $NO_x$ gas by heating the impregnated honeycomb body for a second time and at a second furnace temperature sufficient to form a redox oxide from the source, the redox oxide being supported by the honeycomb body.

2. The method of claim 1 wherein the mixture further comprises a secondary phase material being selected from the group consisting of alumina, zirconia, mullite, silicon carbide, zircon, titania, silicon nitride, ceria, silica, or sources thereof, or mixtures thereof, and after the extruding and before the impregnating, the inorganic binder binds the primary phase material and the secondary phase material.

3. The method of claim 1 wherein the $CeO_2$—$ZrO_2$ has a surface area of at least 15 $m^2$/gram.

4. The method of claim 1 wherein the reducing or oxidizing element is selected from the group consisting of Cu, Fe, W, V, Mo, Co, Mn, La, and combinations thereof.

5. The method of claim 1 wherein the reducing or oxidizing element is selected from the group consisting of Cu, Fe, W, V, Mo, and combinations thereof.

6. The method of claim 1 wherein the reducing or oxidizing element is selected from the group consisting of W, V, Mo, and combinations thereof.

7. The method of claim 1 wherein, the source of the at least one reducing or oxidizing element is a tungstate source.

8. The method of claim 7 wherein the tungstate source is a tungstate precursor.

9. The method of claim 7 wherein the tungstate source is ammonium meta-tungstate.

10. The method of claim 1 further comprising, after extruding and before impregnating, the firing comprises heating the honeycomb body sufficient to consolidate the shaped body.

11. The method of claim 1 wherein, after the impregnated honeycomb body is heated, the redox oxide is present in the honeycomb body, or on the honeycomb body, or both.

12. The method of claim 1 wherein the impregnated honeycomb body is heated for at least 2 hours at a furnace temperature of at least 450° C.

13. The method of claim 1 wherein the inorganic binder is selected from the group consisting of a silicon-based material, a phosphate-based material, and combinations thereof.

14. The method of claim 1 wherein the inorganic binder comprises silicone.

15. The method of claim 1 wherein the zeolite comprises Fe, Ce, W, Mn, Pr, Nd, La, Zr, Al, Cu or mixtures thereof, and the $CeO_2$—$ZrO_2$ is present with a Zr/Ce ratio of greater than 1.0.

16. The method of claim 15 wherein the zeolite is selected from the group consisting of ZSM-5, Chabazite, Beta, Mordenite, Y-zeolite, Ultrastable-Y and aluminum phosphate zeolites, and mixtures thereof.

17. The method of claim 1 wherein the mixture comprises a cellulosic ether.

18. The method of claim 1 wherein the mixture further comprises the organic binder, and the method further comprises, after extruding and before impregnating, heating the honeycomb body sufficient to remove the organic binder from the honeycomb body.

19. The method of claim 1 wherein the mixture further comprises a liquid vehicle, and the method further comprises optionally removing at least a portion of the liquid vehicle from the honeycomb body prior to the firing.

20. The method of claim 1 wherein at least part of the mixture has fibrous constituency.

21. The method of claim 1, further comprising spray drying the mixture to form agglomerates of the mixture prior to extruding the mixture into a honeycomb body.

22. The method of claim 1, further comprising combining at least one pore former with the primary phase material, inorganic binder, and optional organic binder to form the mixture.

23. A method of forming a catalyst structure comprising the steps of:
forming a honeycomb body from a primary phase material consisting of $CeO_2$—$ZrO_2$, wherein the honeycomb body is active for selective catalytic reduction of $NO_x$,
impregnating at least part of the honeycomb body with a tungstate source,
firing the impregnated honeycomb body at a furnace temperature of at least 450° C. for at least 2 hours.

24. A method of forming a catalyst structure comprising the steps of:
extruding a mixture of zeolite and $CeO_2$—$ZrO_2$, with a Zr/Ce ratio of greater than 1.0, into a honeycomb body, wherein the honeycomb body is active for selective catalytic reduction of $NO_x$,
impregnating at least part of the honeycomb body with a tungstate source, then
firing the impregnated honeycomb body at a furnace temperature of at least 450° C. for at least 2 hours.

25. A method of forming a catalyst structure comprising the steps of:
extruding a mixture of an inorganic binder and a primary phase material consisting of zeolite and $CeO_2$—$ZrO_2$, with a Zr/Ce ratio of greater than 1.0, into a honeycomb body, the zeolite comprising less than 50 wt % of the primary phase material, wherein the honeycomb body is active for selective catalytic reduction of $NO_x$;
impregnating at least part of the honeycomb body with a tungstate source, then
firing the impregnated honeycomb body at a furnace temperature of at least 450° C. for at least 2 hours.

26. A method of forming a catalyst structure comprising the steps of:
extruding a mixture of an inorganic binder and a primary phase material consisting of zeolite and $CeO_2$—$ZrO_2$, with a Zr/Ce ratio of greater than 1.0, into a honeycomb body, the zeolite comprising greater than or equal to 50 wt % of the primary phase material, wherein the honeycomb body is active for selective catalytic reduction of $NO_x$; then
firing the honeycomb body at a furnace temperature of at least 450° C. for at least 2 hours, wherein the honeycomb body is substantially free of W; then
impregnating at least part of the honeycomb body with a source of at least one reducing or oxidizing element; and
heating the impregnated honeycomb body for a second time and at a second furnace temperature sufficient to form a redox oxide from the source, the redox oxide being supported by the honeycomb body.

27. The method of claim 26 wherein the source is a tungstate source.

* * * * *